US012749195B2

(12) United States Patent
Wuelker et al.

(10) Patent No.: US 12,749,195 B2
(45) Date of Patent: Sep. 29, 2026

(54) SWITCHING BETWEEN NEURAL NETWORKS BASED ON SCOUT SCAN ANALYSIS

(71) Applicant: KONINKLIJKE PHILIPS N.V., Eindhoven (NL)

(72) Inventors: Christian Wuelker, Hamburg (DE); Kevin Martin Brown, Chardon, OH (US); Michael Grass, Buchholz in der Nordheide (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 314 days.

(21) Appl. No.: 18/037,892

(22) PCT Filed: Nov. 22, 2021

(86) PCT No.: PCT/EP2021/082485
§ 371 (c)(1),
(2) Date: May 19, 2023

(87) PCT Pub. No.: WO2022/112165
PCT Pub. Date: Jun. 2, 2022

(65) Prior Publication Data

US 2023/0419496 A1 Dec. 28, 2023

Related U.S. Application Data

(60) Provisional application No. 63/119,291, filed on Nov. 30, 2020.

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/10081* (2013.01);
(Continued)

(58) Field of Classification Search
CPC ..................... G06T 7/11; G06T 7/0012; G06T 2207/10081; G06T 2207/10088;
(Continued)

(56) References Cited

U.S. PATENT DOCUMENTS 9,607,373 B2 * 3/2017 Buisseret ................ G06T 7/149
9,865,060 B2 1/2018 Mukumoto
(Continued)

FOREIGN PATENT DOCUMENTS

CN 111839574 A 10/2020
JP 2017202310 A 11/2017
(Continued)

OTHER PUBLICATIONS

Reviewing the CT Scout View: Medicolegal and Ethical Considerations, Leonard Berlin (Year: 2014).*
(Continued)

*Primary Examiner* — Ming Shui
(74) *Attorney, Agent, or Firm* — Larry Liberchuk

(57) ABSTRACT

A method is provided for processing medical images, the method including receiving a first image and a second image different from the first image, where the second image is of the same subject matter as the first image. The method further includes identifying a plurality of anatomical structures in the first image and defining a plurality of image segments in the second image based N on locations of the anatomical structures identified in the first image. The method then applies a processing routine associated with a first anatomical structure to the first image segment in the second image and a processing routine associated with a second anatomical structure to the second image segment in the second image. Also provided is an imaging system for
(Continued)

implementing the described method and a non-transitory computer readable medium storing a program for processing medical images.

18 Claims, 5 Drawing Sheets

(52) U.S. Cl.
CPC ............... *G06T 2207/10088* (2013.01); *G06T 2207/10104* (2013.01); *G06T 2207/10108* (2013.01); *G06T 2207/10116* (2013.01)

(58) Field of Classification Search
CPC . G06T 2207/10104; G06T 2207/10108; G06T 2207/10116
See application file for complete search history.

(56) References Cited

U.S. PATENT DOCUMENTS

| | | | | |
|---|---|---|---|---|
| 10,540,764 | B2 | 1/2020 | Tsukagoshi | |
| 11,393,229 | B2 | 7/2022 | Zhou | |
| 11,403,761 | B2 | 8/2022 | Krebs | |
| 2018/0144214 | A1* | 5/2018 | Hsieh | G06T 7/0002 |
| 2018/0330501 | A1* | 11/2018 | Muraoka | A61B 6/486 |
| 2019/0104940 | A1 | 4/2019 | Zhou | |
| 2019/0108904 | A1 | 4/2019 | Zhou | |
| 2019/0139236 | A1* | 5/2019 | Cheng | G06T 7/30 |
| 2019/0156524 | A1 | 5/2019 | Park | |
| 2020/0065940 | A1 | 2/2020 | Tang | |
| 2020/0090005 | A1* | 3/2020 | Ghosh | G06N 3/0464 |
| 2020/0258216 | A1 | 8/2020 | Sharma | |
| 2020/0372612 | A1 | 11/2020 | Higaki | |
| 2021/0366118 | A1* | 11/2021 | Campbell | G06T 19/20 |
| 2022/0076421 | A1* | 3/2022 | Gomez Lopez | G06T 7/0016 |
| 2023/0086070 | A1 | 3/2023 | Liu | |

FOREIGN PATENT DOCUMENTS

| | | | | |
|---|---|---|---|---|
| KR | 20210057847 A * | 5/2021 | | G06N 3/0985 |
| WO | WO2018070285 A1 | 4/2018 | | |
| WO | WO-2020136303 A1 * | 7/2020 | | G06V 10/75 |

OTHER PUBLICATIONS

PCT International Search Report, International application No. PCT/EP2021/082485, Nov. 30, 2020.
Yong Xia et al: "Dual-Modality Brain PET-CT Image Segmentation Based on Adaptive Use of Functional and Anatomical Information", Computerized Medical Imaging and Graphics, Pergamon Press, New York, NY, US, vol. 36, No. 1, Jun. 2011 (Jun. 2011), pp. 47-53, XP028340978.

* cited by examiner

SWITCHING BETWEEN NEURAL NETWORKS BASED ON SCOUT SCAN ANALYSIS

FIELD OF THE INVENTION

The present disclosure generally relates to systems and methods for processing images, such as medical images, using trained neural networks.

BACKGROUND

Conventionally, obtaining images through standard imaging modalities, such as Computed Tomography (CT) scans, results in image artifacts and noise embedded into such images. The images are therefore generally processed using denoising algorithms. Such denoising algorithms are typically associated with specific anatomical structures and are designed, and in the case of learning algorithms, trained, to promote specific image features.

Accordingly, when processing CT scans, reconstruction filters are used to promote certain image characteristics, such as sharpness or soft-tissue contrast. As an example, when reconstructing a head image, a system may use a filter designed to promote soft-tissue contrast in brain tissue, while a different filter may be used to reconstruct a body image. A filter used to reconstruct a body image, in contrast, may be sharper.

Reconstructed images will generally be noisy, and may contain various artifacts of the reconstruction process, and various denoising algorithms, among other algorithms, may then be applied to improve image quality. Accordingly, in the context of learning algorithms for denoising, for example, such as Convolutional Neural Networks (CNNs) for processing CT scans, different filters may have been used during image reconstruction to promote image features, such as sharpness, or to suppress different types of noise. Denoising should be done in a way that preserves the image characteristics promoted by the filter used for reconstruction. As such, learning algorithms, such as CNNs, may be trained for a specific type of anatomy and a specific reconstruction filter.

Due to generally limited network capacity and resulting runtime, when training a CNN to denoise low dose CT images, as an example, the state of the art is to train different networks for different anatomical regions and reconstruction filters designed for such regions. This is especially beneficial if the filters are designed to yield very particular image characteristics in a certain anatomy.

However, a single scan, such as a head-neck scan, may cover multiple different anatomical regions and corresponding anatomical structures. If such an image is reconstructed with a head filter, a natural choice would be to use a network trained on the same filter, but such a network would typically not have seen any anatomy during training other than heads. Training a single network on a single filter with a variety of anatomies would typically result in suboptimal performance in other regions, particularly where the filter is designed for a specific anatomy.

Further, it is generally not feasible to train a single network on a variety of anatomies reconstructed with the same filter due to the limited available network capacity and the resulting runtime that would result.

SUMMARY

A system and method for processing medical images is described in which multiple anatomical structures appear in a single image, and distinct processing routines are applied to each such anatomical structure. As such, for example, distinct machine learning methods may be used to process different portions of a single image containing multiple such anatomical structure.

In addition to applying distinct processing routines to different anatomical structures appearing within a single image, the described system and method may further determine where in such an image to switch between such processing techniques. Such a determination may therefore be made based on a scout scan available independently of a primary medical image being processed. Multiple anatomical structures may therefore be defined in a preliminary image, such as a scout scan, using machine learning or classical techniques. Such definitions may then be applied to a primary image different than the scout scan where the primary image is of the same subject matter.

Accordingly, a method is provided for processing medical images in which the method receives a first image and receives a second image different from the first image, where the second image comprises the same subject matter as the first image. The method then identifies a plurality of different anatomical structures in the first image and then defines a plurality of image segments in the second image based on locations of the different anatomical structures identified in the first image, such that a first image segment of the plurality of image segments contains a first anatomical structure of the plurality of different anatomical structures and a second image segment of the plurality of image segments contains a second anatomical structure of the plurality of different anatomical structures.

The method then applies a first processing routine associated with the first anatomical structure to the first image segment to obtain a processed first image segment and applies a second processing routine associated with the second anatomical structure to the second image segment to obtain a processed second image segment and then outputs a processed second image including both the processed first image segment and the processed second image segment.

In some embodiments, the first image or the second image is selected from an imaging modality comprising Computed Tomography (CT), Magnetic Resonance Imaging (MRI), Positron Emission Tomography (PET), Single-Photon Emission Computerized Tomography (SPECT), X-ray imaging, including Digital X-ray Radiogrammetry (DXR), or fluoroscopy sequences in Image-Guided Therapy (IGT) imaging.

For example, the second image may be a CT image, or a primary image for a different imaging modality, and the first image may be a scout scan for the primary image. Accordingly, where the second image is a CT image, the scout scan may be acquired using a lower radiation dose than the second image.

In some embodiments, the plurality of different anatomical structures in the first image may be identified prior to receiving the second image, such that those identifications are available when the second image is received. In some embodiments, the plurality of different anatomical structures in the first image are identified when receiving the second image.

In some embodiments, the first image segment excludes the second anatomical structure and the second image segment excludes the first anatomical structure. In some embodiments, the first image segment and the second image segment are parsed linearly, such that the first image segment includes a full width of an upper part of the second image and the second image segment includes a full width of a lower part of the second image.

The first anatomical structure or the second anatomical structure may be selected from a head, a neck, an upper body, an abdomen, a pelvic region, a lower body, and legs.

In some embodiments, the first processing routine is a first machine learning algorithm associated with the first anatomical structure, and the second processing routine is a second machine learning algorithm associated with the second anatomical structure.

Also provided is an imaging system comprising a memory that stores a plurality of instructions, an imaging unit, and processor circuitry that couples to the memory and is configured to execute instructions to obtain the images and implement the method described above. The second image may be received from the imaging unit in such a system.

Also provided is a non-transitory computer readable medium storing a program for processing medical images comprising instructions to implement the methods discussed above. Such a method may be implemented, for example, in the context of the system described.

DETAILED DESCRIPTION OF THE PREFERRED EMBODIMENTS

Figure 1:
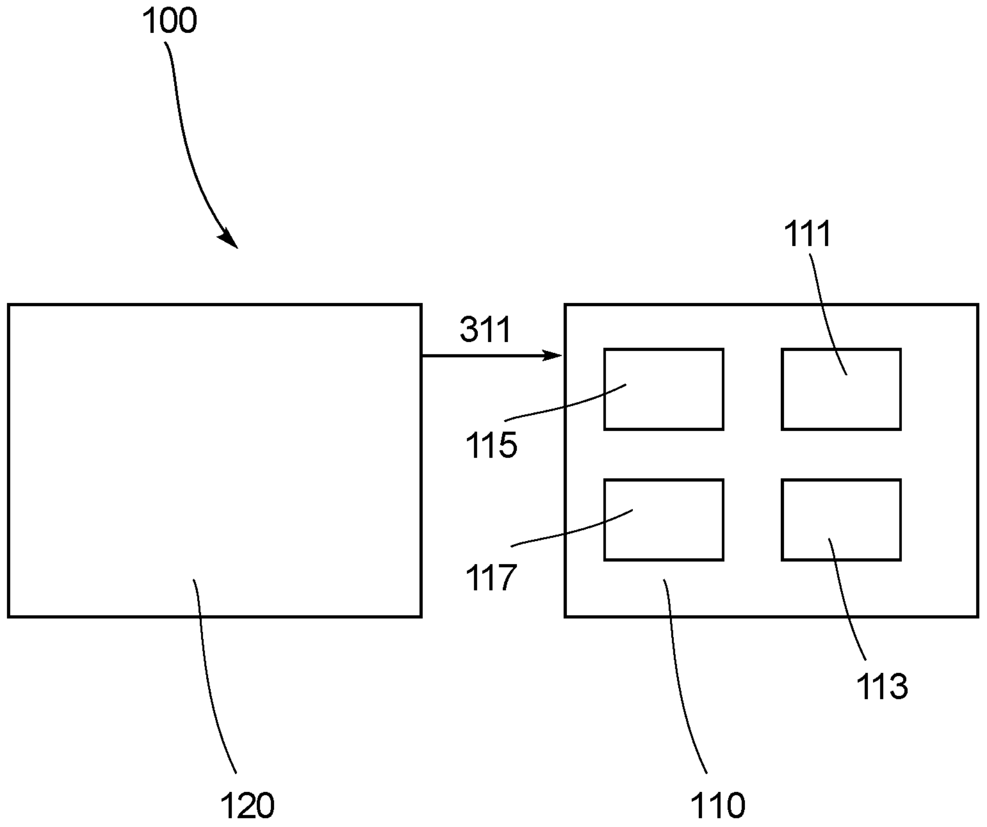
FIG. 1 is a schematic diagram of a system according to one embodiment of the present disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Generally, a single image is reconstructed with a single filter, and a filter is therefore selected appropriate to the subject matter of the image being reconstructed. As such, when reconstructing a head image, a system may use a filter designed to promote soft-tissue contrast in brain tissue. However, a different, and potentially sharper, filter may be used when reconstructing a body image.

Accordingly, in the context of Computed Tomography (CT) based medical imaging, for example, different image processors, such as machine learning algorithms which may take the form of Convolutional Neural Networks (CNNs), may be used to process images. These image processors are then trained, in the case of machine learning algorithms, on corresponding different anatomical regions and structures in the context of reconstruction filters.

In medical imaging other than CT, such as Magnetic Resonance Imaging (MRI) or Positron Emission Tomography (PET), a method other than the use of such reconstruction filters may be used to recreate and process images. Rather, different reconstruction algorithms may be used depending on the type of scan or data acquisition, as well as on the desired image characteristics for a particular scan. The reconstruction algorithm may then be adjusted to yield certain image characteristics. For example, in common iterative MRI or PET reconstruction, the number of iterations may be carefully chosen, and a regularization term may be added.

However, a single scan, such as a head-neck scan, may cover different anatomical regions. As such, a system and method are provided for efficiently processing distinct anatomical regions in a single image.

FIG. 1 is a schematic diagram of a system 100 according to one embodiment of the present disclosure. As shown, the system 100 typically includes a processing device 110 and an imaging device 120.

The processing device 110 may apply processing routines to images received. The processing device 110 may include a memory 113 and processor circuitry 111. The memory 113 may store a plurality of instructions. The processor circuitry 111 may couple to the memory 113 and may be configured to execute the instructions. The instructions stored in the memory 113 may comprise processing routines, as well as data associated with multiple machine learning algorithms, such as various Convolutional Neural Networks for processing images.

The processing device 110 may further include an input 115 and an output 117. The input 115 may receive information, such as images, from the imaging device 120. The output 117 may output information to a user or a user interface device. The output may include a monitor or display.

In some embodiments, the processing device 110 may relate to the imaging device 120 directly. In alternate embodiments, the processing device 110 may be distinct from the imaging device 120, such that it receives images for processing by way of a network or other interface at the input 115.

In some embodiments, the imaging device 120 may include an image data processing device, and a spectral or conventional CT scanning unit for generating the CT projection data when scanning an object (e.g., a patient).

Figure 2:
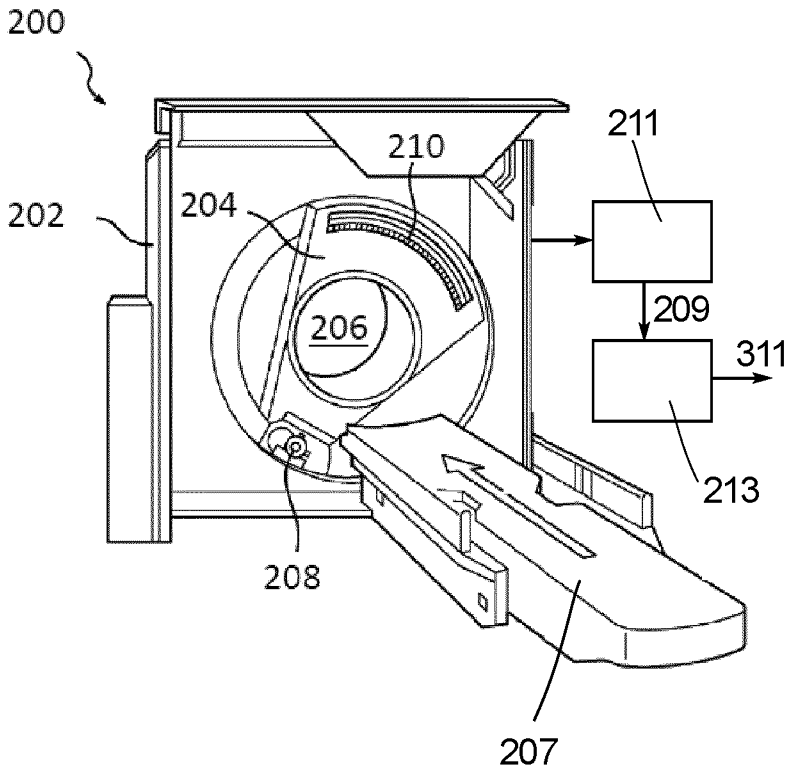
FIG. 2 illustrates an imaging device according to one embodiment of the present disclosure.

FIG. 2 illustrates an exemplary imaging device according to one embodiment of the present disclosure. It will be understood that while a CT imaging device is shown, and the following discussion is in the context of CT images, similar methods may be applied in the context of other imaging devices, and images to which these methods may be applied may be acquired in a wide variety of ways.

In an imaging device in accordance with embodiments of the present disclosure, the CT scanning unit may be adapted for performing multiple axial scans and/or a helical scan of an object in order to generate the CT projection data. In an imaging device in accordance with embodiments of the present disclosure, the CT scanning unit may comprise an energy-resolving photon counting image detector. The CT scanning unit may include a radiation source that emits radiation for traversing the object when acquiring the projection data.

Further, in an imaging device in accordance with embodiments of the present disclosure, the CT scanning unit may perform scout scans distinct from primary scans, thereby generating distinct images associated with a scout scan and a primary scan, where the images are different but comprise the same subject matter.

In the example shown in FIG. 2, the CT scanning unit 200, e.g. the Computed Tomography (CT) scanner, may include a stationary gantry 202 and a rotating gantry 204, which may be rotatably supported by the stationary gantry 202. The rotating gantry 204 may rotate, about a longitudinal axis, around an examination region 206 for the object when acquiring the projection data. The CT scanning unit 200 may include a support 207 to support the patient in the examination region 206 and configured to pass the patient through the examination region during the imaging process.

The CT scanning unit 200 may include a radiation source 208, such as an X-ray tube, which may be supported by and configured to rotate with the rotating gantry 204. The radiation source 208 may include an anode and a cathode. A source voltage applied across the anode and the cathode may accelerate electrons from the cathode to the anode. The electron flow may provide a current flow from the cathode to the anode, such as to produce radiation for traversing the examination region 206.

The CT scanning unit 200 may comprise a detector 210. The detector 210 may subtend an angular arc opposite the examination region 206 relative to the radiation source 208. The detector 210 may include a one or two dimensional array of pixels, such as direct conversion detector pixels. The detector 210 may be adapted for detecting radiation traversing the examination region and for generating a signal indicative of an energy thereof.

The CT scanning unit 200 may further include generators 211 and 213. The generator 211 may generate tomographic projection data 209 based on the signal from the detector 210. The generator 213 may receive the tomographic projection data 209 and generate a raw image 311 of the object based on the tomographic projection data 209. The initial image 311 may be either the scout scan or the primary scan, and may be input to the input 115 of the processing device 100.

Figure 3A:
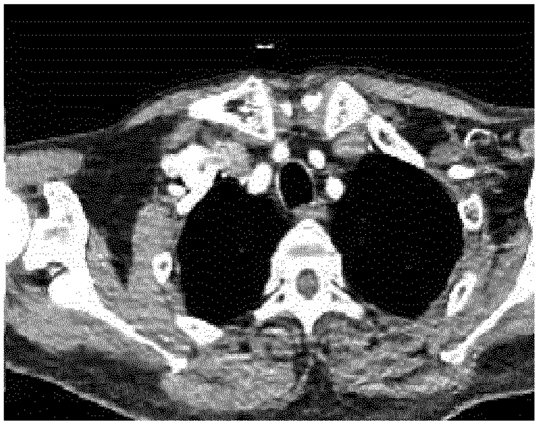
FIGS. 3A and 3B show an identical image processed with two distinct processing routines.
Figure 3B:
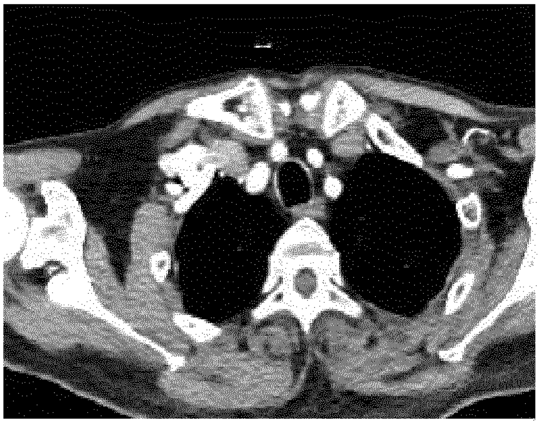

FIGS. 3A and 3B show an identical image processed with two distinct processing routines resulting in different processed images. A raw image 311 is typically received at the input 115 of the processing device 110. The image 311 is then processed in accordance with a processing routine. The processing routine may include, for example, reconstruction of the image 311 with a filter implementing a machine learning algorithm, such as a Convolutional Neural Network (CNN). Such a machine learning algorithm is typically trained on sample images similar to those to which it will ultimately be applied. Therefore, the processing routine may be specific to a particular anatomical region or a corresponding reconstruction filter.

As such, the processing routine may be the application of a reconstruction filter designed for a particular anatomical region and a corresponding CNN trained on that particular anatomical region, such as a head network trained on a head filter. A head filter may be specifically designed to promote soft-tissue contrast in brain tissue and then trained with head images, while a body filter may instead be designed to provide sharper results and paired with a CNN trained on body images.

However, in use, scans obtained using imaging system 120 may contain multiple anatomical regions. With this in mind, FIG. 3A shows an image acquired in a head-neck scan reconstructed using a head filter and subsequently denoised with a network trained on head anatomy using that head filter. In contrast, FIG. 3B shows the same image as that shown in FIG. 3A reconstructed using a body filter and then denoised with a network trained on body anatomy.

The resulting processed image shown in FIG. 3A is substantially noisier and of lower quality than that shown in FIG. 3B despite the fact that each image was denoised using a CNN trained on the corresponding filter. This is due to the fact that a head network typically has not seen any anatomy other than a head during training. A similar phenomenon appears when a body network and filter are applied to a head region scan.

Accordingly, when images are provided that contain multiple anatomical structures, existing systems and methods must determine which of several potential processing routines should be applied. In accordance with this disclosure, methods are proposed in which distinct image segments within a single image may be processed using distinct processing routines. As such, distinct filters with different CNNs trained with such filters, may be applied to different image segments associated with corresponding anatomical structures.

The method according to one embodiment of the present invention further determines where best to switch between such different processing routines during processing by evaluating a first image, such as a scout scan, containing the same subject matter as a primary image being processed.

Figure 4:
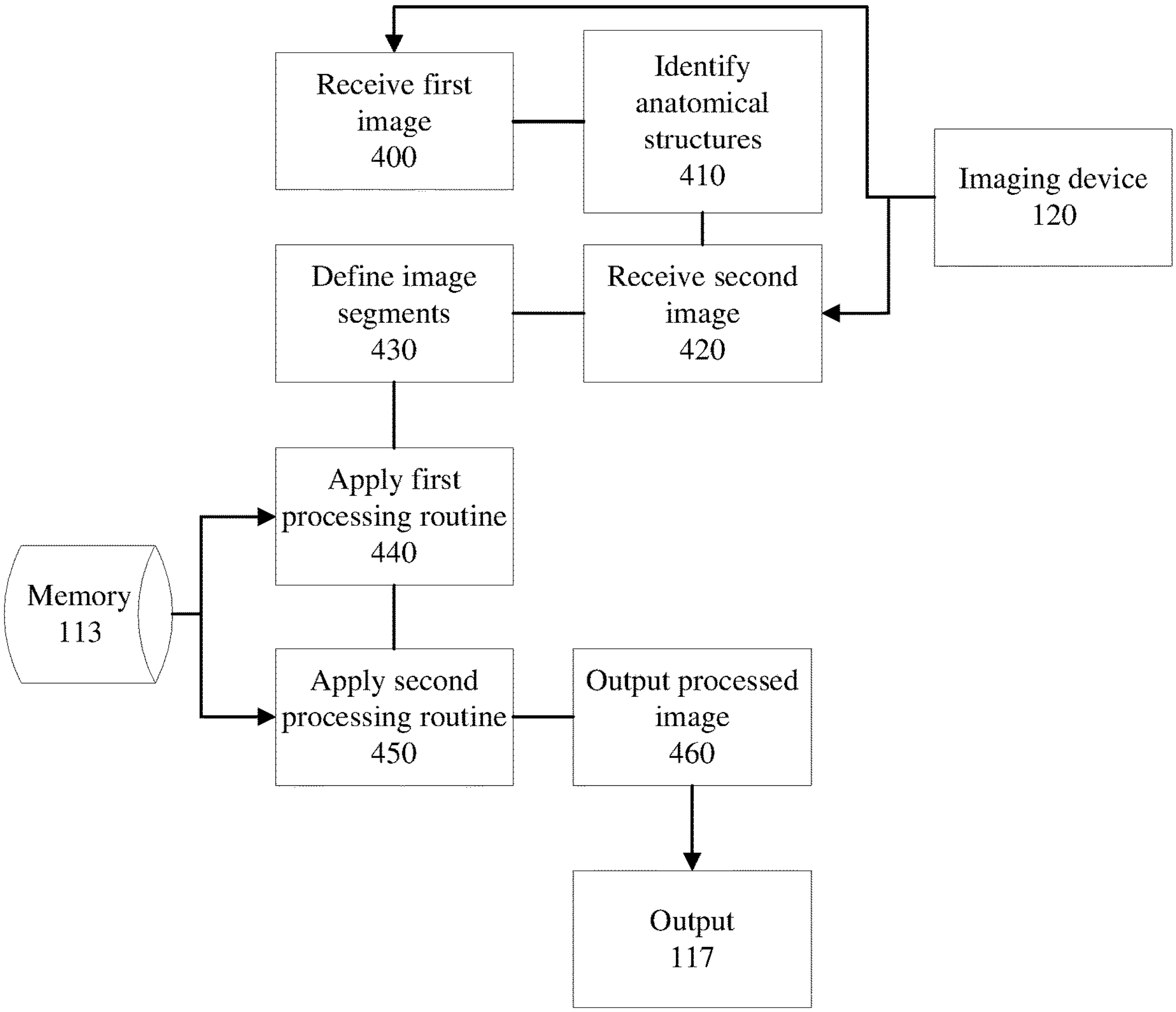
FIG. 4 is a flowchart illustrating a method for processing medical images in accordance with this disclosure.

FIG. 4 is a flowchart illustrating a method for processing medical images in accordance with this disclosure. As shown, the method includes applying distinct networks trained on different anatomies to different parts of an image.

The method comprises initially receiving a first image (at 400) at the input 115 of the processing device 110 from the imaging device 120. The first image may be, for example, a scout scan performed using the same imaging device 120 as a later primary image. The scout scan received may be, for example, a planning image to be used for planning the later primary image, and may be obtained, in the case of a CT scan, using a lower radiation dose than the later primary image. It will be understood that images may be received in a wide variety of formats, including image formats output directly by the imaging device 120 and partially processed data associated with such images. Further, the first image received (at 400) and any further images discussed below may take different forms and may comprise different file types. Accordingly, the first image may be received in a raw data form that can be processed to identify anatomical structures, as discussed below, regardless of whether such data can be fully reconstructed to create the corresponding first image.

The method then identifies (at 410) a plurality of different anatomical structures in the first image. These anatomical structures may be, for example, a head, a neck, an upper body, an abdomen, a pelvic region, a lower body, and legs, among others. The first image may contain two such anatomical structures, or it may contain several such structures, such as in the context of a full body scan.

After receiving the first image (at 400), the method receives a second image (at 420) different than the first image. The second image may be a primary image, and while the second image is different than the first image, it typically comprises the same subject matter as the first image. Accordingly, where the first image, obtained at 400, comprises multiple anatomical structures, identified at 410, the second image, obtained at 420, typically comprises the same multiple anatomical structures.

The first image or the second image may be obtained using a variety of imaging modality. Such an image may then be obtained by way of Computed Tomography (CT), such as by way of the imaging device 120 discussed above, or may be obtained using Magnetic Resonance Imaging (MRI), Positron Emission Tomography (PET), Single-Photon Emission Computerized Tomography (SPECT), X-ray imaging, including Digital X-ray Radiogrammetry (DXR), or fluoroscopy sequences in Image-Guided Therapy (IGT) imaging. When using any of these imaging modalities, the first image and the second image may both be obtained using the same imaging modality, or the first image may be obtained using an imaging modality different from that of the second image.

For example, the first image may be a scout scan for a CT scan, and may be obtained using CT. However, the first image may then be acquired using a lower radiation dose than the second image, and may then be used as a planning image for the CT scan, which would then be taken using a higher radiation dose. In other embodiments, a scout scan may be obtained using a different imaging modality, such that the scout scan is faster, easier, less invasive, or less expensive, or otherwise more convenient. For example, a scout scan may be obtained using an X-ray process followed by a primary scan obtained using CT. Similarly, a CT scan may be used as a scout scan followed by a PET or SPECT as the primary image. In some such embodiments, the CT scan may be utilized to improve the PET or SPECT reconstruction in addition to use of such a CT image to define different anatomical structures in the image. The first image or the second image may each be a three dimensional image, or it may be a two dimensional image. Further, the first image may be taken at a lower resolution or with a lower contrast or color concentration than the second image.

Further, in some embodiments, the identification of the plurality of different anatomical structures in the first image (at 410) occurs prior to the receipt of the second image (at 420) from the imaging unit 120. In such an embodiment, the method may then have anatomical structures defined prior to receiving the second image, allowing for more efficient processing of the corresponding second image. Similarly, in some embodiments, the plurality of different anatomical structures in the first image is identified when receiving the second image (at 420). These approaches allow systems 100 implementing the described method to improve the processing efficiency of the system by completing all processing associated with identifying the different anatomical structures in the first image prior to or while receiving the second image. Accordingly, once the second image is partially or completely received, the second image may immediately be processed based on the identifications obtained from the first image.

In some embodiments, the processing of the first image need not be completed prior to beginning processing of the second image. As such, once an anatomical structure is identified in the first image and a corresponding portion of a second image has been received, the relevant portion of the second image may be processed in accordance with the following steps.

The method then defines (at 430) a plurality of image segments in the second image based on locations of the different anatomical structures identified in the first image. Accordingly, where the first image was determined to contain (at 410) a first anatomical structure, such as a head, and a second anatomical structure, such as a neck, the method defines a first image segment containing the first anatomical structure and a second image segment containing the second anatomical structure.

In embodiments in which the anatomical structures are defined (at 410) prior to receipt of the second image (at 420), the image segments may be defined (at 430) immediately following receipt of the second image. In some embodiments, where the image is received at the processing unit 110 as it is obtained by an imaging device 120 (at 420), such anatomical structures may be identified and corresponding image segments may be defined prior to or while receiving the entire second image. For example, where a full body scan is performed following a scout scan, an image segment corresponding to a first anatomical structure to be scanned may be retrieved and processed, as discussed, below, prior to completing the scan generating the second image.

Once multiple image segments are defined (at 430), different processing routines are applied to each image segment. Accordingly, a first processing routine is applied (at 440) to the first image segment, where the first processing routine is associated with the first anatomical structure contained in the first image segment.

Separately, a second processing routine is applied (at 450) to the second image segment, where the second processing routine is associated with the second anatomical structure contained in the second image segment. The first and second anatomical structures are different anatomical structures, and the processing routines applied to each are different from each other.

As noted above, although the embodiment shown discusses the initial defining of multiple image segments (at 430) followed by application of the processing routines (at 440, 450), in some embodiments, one of the multiple image segments may be defined prior to receiving the complete second image. In such a scenario, the first image segment may be defined (at 430) and processing may begin (at 440) prior to receiving the complete second image.

The processing routines described are generally software routines designed to improve the quality or clarity of the second image. Such routines may be, for example, denoising routines, or may otherwise remove artifacts of the imaging modality used. The processing routines may be machine learning algorithms, and each such algorithm may be trained on a corresponding anatomical structure. Accordingly, the first processing routine, applied at 440, may be a first machine learning algorithm, such as a CNN trained on the first anatomical structure. The second processing routine, applied at 450, may then be a second machine learning algorithm, such as a CNN trained on the second anatomical structure.

The processing routines may further include reconstruction of the relevant image segment using an appropriate filter designed for the corresponding anatomical structure. Accordingly, where the first anatomical structure is a patient's head, the first processing routine, applied at 440, may be reconstruction of the corresponding first image segment using a head filter and then denoising using a corresponding head CNN trained on the head filter. Similarly, where the second anatomical structure is a patient's neck or torso, the second processing routine, applied at 450, may be reconstruction of the corresponding second image segment using a body filter and then denoising using a CNN associated with the neck or torso trained on the same body filter.

In some embodiments, the same reconstruction filter may be used for multiple image segments, but different CNNs trained on corresponding anatomy are applied to the different image segments. It will be understood that while CNNs are described, alternative algorithm architectures, including various machine learning algorithms, may be utilized as well.

After the defined first and second image segments are processed (at 440 and 450, respectively), a processed second image is output (at 460). The processed second image contains the processed first image segment and the processed second image segment. If the first and second image segments were parsed into distinct images for processing purposes, they would typically be recombined into a single image prior to outputting the same.

In the embodiment shown, the method identifies the plurality of anatomical structures in the first image (at 410). This may be by using a processing routine, such as application of a machine learning algorithm to identify anatomical structures. The anatomical structures may be identified by identifying landmarks in an image associated with such structures, for example. Alternatively, such anatomical structures may be identified manually prior to the parsing of the image into the corresponding image segments. Such manual identification may be by a technician identifying structures in a scout scan at a user interface before, during, or after obtaining the primary scan.

In some embodiments, the identification of the anatomical structures may take place in the same image as that being processed. In such embodiments, rather than identifying anatomical structures in a first image and then processing a second image, a first analysis is performed on the image in which anatomical structures and corresponding image segments are identified followed by a second analysis in which image segments are processed differently.

Figure 5:
FIG. 5 shows the parsing of an image in accordance with this disclosure.

FIG. 5 shows the parsing of an image 500 in accordance with this disclosure. As shown, the image 500 contains a head 510, neck 520, and upper torso 530, of a patient being scanned. Typically, the method would then identify the distinct anatomical structures associated with each of the head 510, neck 520, and upper torso 530, and would then define a first image segment 540 associated with a first anatomical structure, such as the head 510, and a second image segment 550 associated with a second anatomical structure, such as the upper torso 530.

While two image segments 540, 550 are shown, a third distinct image segment may be defined as well to encompass the neck 520. Alternatively, in the embodiment shown, the second image segment 550 may be defined to include both the neck 520 and upper torso 530, and to process both using a single processing routine appropriate to both.

It is noted that in order to ease the understanding of the method according to one embodiment of the present invention, FIG. 5 is provided as an example of a scout scan. While the image segments 540, 550 are shown on the scout scan image 500 shown, it will be understood that during use, such image segments would be defined in a primary image received following the receipt of the scout scan.

As shown, the first and second image segments 540, 550 may be parsed linearly, such that the first image segment 540 includes a full width of an upper part of the image 500 and the second image segment 550 includes a full width of a lower part of the image.

Further, as shown, the first image segment 540 may be defined to exclude the second anatomical structure, namely the upper torso 530, and the second image segment 550 may be defined to exclude the first anatomical structure, namely the head 510. This approach prevents a single portion of the image from being processed separately using the first processing routine and the second processing routine.

Alternatively, a portion of the image may be defined as being part of both the first image segment 540 and the second image segment 550. In such an embodiment, the results of the first processing routine and the second processing routine may be merged prior to outputting the processed second image (at 460). Such merging may be, for example, by averaging the resulting overlapping image segment.

It will be understood that although the methods described herein are described primarily in the context of CT scan images, various imaging technology, including various medical imaging technologies are contemplated, and images generated using a wide variety of imaging technologies can be effectively denoised or otherwise processed using the methods described herein.

The methods according to the present disclosure may be implemented on a computer as a computer implemented method, or in dedicated hardware, or in a combination of both. Executable code for a method according to the present disclosure may be stored on a computer program product. Examples of computer program products include memory devices, optical storage devices, integrated circuits, servers, online software, etc. Preferably, the computer program product may include non-transitory program code stored on a computer readable medium for performing a method according to the present disclosure when said program product is executed on a computer. In an embodiment, the computer program may include computer program code adapted to perform all the steps of a method according to the present disclosure when the computer program is run on a computer. The computer program may be embodied on a computer readable medium.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for processing medical images, comprising:

receiving a first image that corresponds to a scout scan;

identifying a plurality of different anatomical structures in the first image;

receiving a second image different from the first image, wherein the second image comprises the same subject matter as the first image;

defining a plurality of image segments in the second image utilizing locations of the different anatomical structures identified in the first image, such that a first image segment of the plurality of image segments contains a first anatomical structure of the plurality of different anatomical structures, and a second image segment of the plurality of image segments contains a second anatomical structure of the plurality of different anatomical structures, wherein the first anatomical structure is different from the second anatomical structure;

applying a first processing routine comprising a neural network trained for the first anatomical structure to the first image segment to obtain a processed first image segment;

applying a second processing routine, different from the first processing routine, comprising a neural network trained for the second anatomical structure to the second image segment to obtain a processed second image segment; and outputting a third image in which the processed first image segment and the processed second image segment are recombined to form a single composite image.

2. The method of claim 1, wherein the first image or the second image is selected from an imaging modality comprising at least one of Computed Tomography (CT), Magnetic Resonance Imaging (MRI), Positron Emission Tomography (PET), Single-Photon Emission Computerized Tomography (SPECT), X-ray imaging, including Digital X-ray Radiogrammetry (DXR), and fluoroscopy sequences in Image-Guided Therapy (IGT) imaging.

3. The method of claim 1, wherein the scout scan is acquired using a lower radiation dose than the second image.

4. The method of claim 1, wherein the plurality of different anatomical structures in the first image is identified prior to receiving the second image.

5. The method of claim 1, wherein the plurality of different anatomical structures in the first image is identified when receiving the second image.

6. The method of claim 1, wherein the first image segment excludes the second anatomical structure, and the second image segment excludes the first anatomical structure.

7. The method of claim 1, wherein the first image segment and the second image segment are parsed linearly, such that the first image segment includes a full width of an upper part of the second image and the second image segment includes a full width of a lower part of the second image.

8. The method of claim 1, wherein the first anatomical structure or the second anatomical structure is selected from a head, a neck, an upper body, an abdomen, a pelvic region, a lower body, and legs.

9. An imaging system for processing medical images, comprising:

a memory that stores a plurality of instructions; and a processor that couples to the memory and is configured to execute the instructions to:

obtain a first image that corresponds to a scout scan;

identify a plurality of different anatomical structures in the first image;

obtain a second image different from the first image, wherein the second image comprises the same subject matter as the first image;

define a plurality of image segments in the second image utilizing locations of the different anatomical structures identified in the first image, such that a first image segment of the plurality of image segments contains a first anatomical structure of the plurality of different anatomical structures and a second image segment of the plurality of image segments contains a second anatomical structure of the plurality of different anatomical structures, wherein the first anatomical structure is different from the second anatomical structure;

apply a first processing routine comprising a neural network trained for the first anatomical structure to the first image segment to obtain a processed first image segment;

apply a second processing routine, different from the first processing routine, comprising a neural network trained for the second anatomical structure to the second image segment to obtain a processed second image segment; and output a third image in which the processed first image segment and the processed second image segment are recombined to form a single composite image.

10. The system of claim 9, wherein the first image or the second image is selected from an imaging modality comprising at least one of Computed Tomography (CT), Magnetic Resonance Imaging (MRI), Positron Emission Tomography (PET), Single-Photon Emission Computerized Tomography (SPECT), X-ray imaging, including Digital X-ray Radiogrammetry (DXR), and fluoroscopy sequences in Image-Guided Therapy (IGT) imaging.

11. The system of claim 9, wherein the scout scan is acquired using a lower radiation dose than the second image.

12. The system of claim 9, wherein the plurality of different anatomical structures in the first image is identified prior to receiving the second image.

13. The system of claim 9, wherein the plurality of different anatomical structures in the first image is identified when receiving the second image.

14. The system of claim 9, wherein the first image segment excludes the second anatomical structure and the second image segment excludes the first anatomical structure.

15. The system of claim 9, wherein the first image segment and the second image segment are parsed linearly, such that the first image segment includes a full width of an upper part of the second image and the second image segment includes a full width of a lower part of the second image.

16. The system of claim 9, wherein the first anatomical structure or the second anatomical structure is selected from a head, a neck, an upper body, an abdomen, a pelvic region, a lower body, and legs.

17. A non-transitory computer readable medium for storing a program for processing medical images comprising instructions to:

obtain a first image that corresponds to a scout scan;

identify a plurality of different anatomical structures in the first image;

obtain a second image different from the first image, wherein the second image comprises the same subject matter as the first image;

define a plurality of image segments in the second image based on locations of the different anatomical structures identified in the first image, such that a first image segment of the plurality of image segments contains a first anatomical structure of the plurality of different anatomical structures and a second image segment of the plurality of image segments contains a second anatomical structure of the plurality of different anatomical structures, wherein the first anatomical structure is different from the second anatomical structure;

apply a first processing routine comprising a neural network trained for the first anatomical structure to the first image segment to obtain a processed first image segment;

apply a second processing routine, different from the first processing routine, comprising a neural network trained for the second anatomical structure to the second image segment to obtain a processed second image segment; and output a third image in which the processed first image segment and the processed second image segment are recombined to form a single composite image.

18. The non-transitory computer readable medium of claim 17, wherein the instructions provide identifying the plurality of different anatomical structures in the first image prior to or while receiving the second image.

* * * * *